US010225366B1

(12) United States Patent
Chou et al.

(10) Patent No.: US 10,225,366 B1
(45) Date of Patent: Mar. 5, 2019

(54) CLASSIFICATION-BASED SELECTION OF A DEVICE FOR USE IN OUTPUTTING A MESSAGE

(71) Applicant: Verily Life Sciences LLC, Mountain View, CA (US)

(72) Inventors: Katherine Chou, Mountain View, CA (US); Diane Tang, Palo Alto, CA (US)

(73) Assignee: Verily Life Sciences LLC, Mountain View, CA (US)

(*) Notice: Subject to any disclaimer, the term of this patent is extended or adjusted under 35 U.S.C. 154(b) by 699 days.

(21) Appl. No.: 14/689,882

(22) Filed: Apr. 17, 2015

(51) Int. Cl.
*H04L 29/08* (2006.01)

(52) U.S. Cl.
CPC ............ *H04L 67/327* (2013.01); *H04L 67/10* (2013.01)

(58) Field of Classification Search
CPC ....... H04L 67/327; H04L 67/10; H04L 67/32; H04L 67/30
USPC ........ 709/201, 217, 218, 220, 222, 223, 226
See application file for complete search history.

(56) References Cited

U.S. PATENT DOCUMENTS

| | | | |
|---|---|---|---|
| 5,721,827 A | 2/1998 | Logan et al. | |
| 7,493,369 B2 | 2/2009 | Horvitz et al. | |
| 7,685,252 B1* | 3/2010 | Maes | G06F 9/4443 709/217 |
| 8,487,772 B1* | 7/2013 | Higgins | G06Q 30/0201 340/146.2 |
| 8,660,613 B2 | 2/2014 | Minear et al. | |
| 8,688,085 B2 | 4/2014 | White et al. | |
| 8,725,570 B2 | 5/2014 | Doughty et al. | |
| 2008/0313108 A1* | 12/2008 | Carrabis | A61B 5/16 706/11 |
| 2010/0186031 A1* | 7/2010 | Pradeep | A61B 5/04842 725/34 |
| 2011/0106621 A1* | 5/2011 | Pradeep | G06Q 30/02 705/14.52 |
| 2011/0282749 A1* | 11/2011 | Pradeep | G06Q 30/02 705/14.66 |
| 2012/0083668 A1* | 4/2012 | Pradeep | A61B 5/04015 600/300 |
| 2013/0078972 A1* | 3/2013 | Levien | H04L 65/605 455/414.4 |
| 2013/0079052 A1* | 3/2013 | Levien | H04L 67/30 455/552.1 |
| 2013/0080961 A1* | 3/2013 | Levien | H04L 51/24 715/773 |
| 2013/0109302 A1* | 5/2013 | Levien | H04M 7/0024 455/39 |
| 2015/0371663 A1* | 12/2015 | Gustafson | G10L 15/265 704/270.1 |
| 2016/0232131 A1* | 8/2016 | Liu | G06F 17/211 |

* cited by examiner

*Primary Examiner* — Davoud A Zand
(74) *Attorney, Agent, or Firm* — McDonnell Boehnen Hulbert & Berghoff LLP

(57) ABSTRACT

In one aspect, an example method involves selecting, by a computing device, a message to be output to a user; determining a classification group to which the user belongs; using the determined classification group to which the user belongs as a basis to select a device from among a plurality of devices associated with the user; and transmitting, by the computing device, an instruction via a communication network, wherein the instruction is configured to cause the selected device to output the selected message.

20 Claims, 4 Drawing Sheets

US 10,225,366 B1

CLASSIFICATION-BASED SELECTION OF A DEVICE FOR USE IN OUTPUTTING A MESSAGE

USAGE AND TERMINOLOGY

In this disclosure, unless otherwise specified and/or unless the particular context clearly dictates otherwise, each usage of "a" or "an" means at least one, and each usage of "the" means the at least one.

BACKGROUND

Unless otherwise indicated herein, the materials described in this section are not prior art to the claims in this disclosure and are not admitted to be prior art by inclusion in this section.

Various types of devices may output messages for use by respective users of those devices. For example, a laptop may output an email message via a display screen such that the message can be read by a user. As another example, a cellular telephone may output a text message via a display screen such that the message can be read by a user. As yet another example, a land-line telephone may output a recorded or generated audio message via a speaker such that the message can be heard by a user.

SUMMARY

In a first aspect, an example method involves selecting, by a computing device, a message to be output to a user; determining a classification group to which the user belongs; using the determined classification group to which the user belongs as a basis to select a device from among a plurality of devices associated with the user; and transmitting, by the computing device, an instruction via a communication network, wherein the instruction is configured to cause the selected device to output the selected message.

In a second aspect, an example non-transitory computer-readable medium has stored thereon program instructions that when executed by a processor, cause performance of a set of acts involving selecting a message to be output to a user; determining a classification group to which the user belongs; using the determined classification group to which the user belongs as a basis to select a device from among a plurality of devices associated with the user; and transmitting an instruction via a communication network, wherein the instruction is configured to cause the selected device to output the selected message.

In a third aspect, disclosed are means for selecting a message to be output to a user; determining a classification group to which the user belongs; means for using the determined classification group to which the user belongs as a basis to select a device from among a plurality of devices associated with the user; and means for transmitting an instruction via a communication network, wherein the instruction is configured to cause the selected device to output the selected message.

In fourth aspect, an example method involves selecting, by a computing device, a message to be output to a user; determining a classification group to which the user belongs; using the determined classification group to which the user belongs as a basis to select an output modality from among a plurality of output modalities of a device; and transmitting, by the computing device, an instruction via a communication network, wherein the instruction is configured to cause the device to output the selected message using the selected output modality.

In a fifth aspect, an example non-transitory computer-readable has stored thereon program instructions that when executed by a processor, cause performance of a set of acts involving selecting a message to be output to a user; determining a classification group to which the user belongs; using the determined classification group to which the user belongs as a basis to select an output modality from among a plurality of output modalities of a device; and transmitting an instruction via a communication network, wherein the instruction is configured to cause the device to output the selected message using the selected output modality.

In a sixth aspect, disclosed are means for selecting a message to be output to a user; means for determining a classification group to which the user belongs; means for using the determined classification group to which the user belongs as a basis to select an output modality from among a plurality of output modalities of a device; and means for transmitting an instruction via a communication network, wherein the instruction is configured to cause the device to output the selected message using the selected output modality.

These, as well as other aspects, alternatives, and advantages, will become apparent to those of ordinary skill in the art by reading the following detailed description, with reference where appropriate to the accompanying drawings.

DETAILED DESCRIPTION

I. Overview

Figure 1:
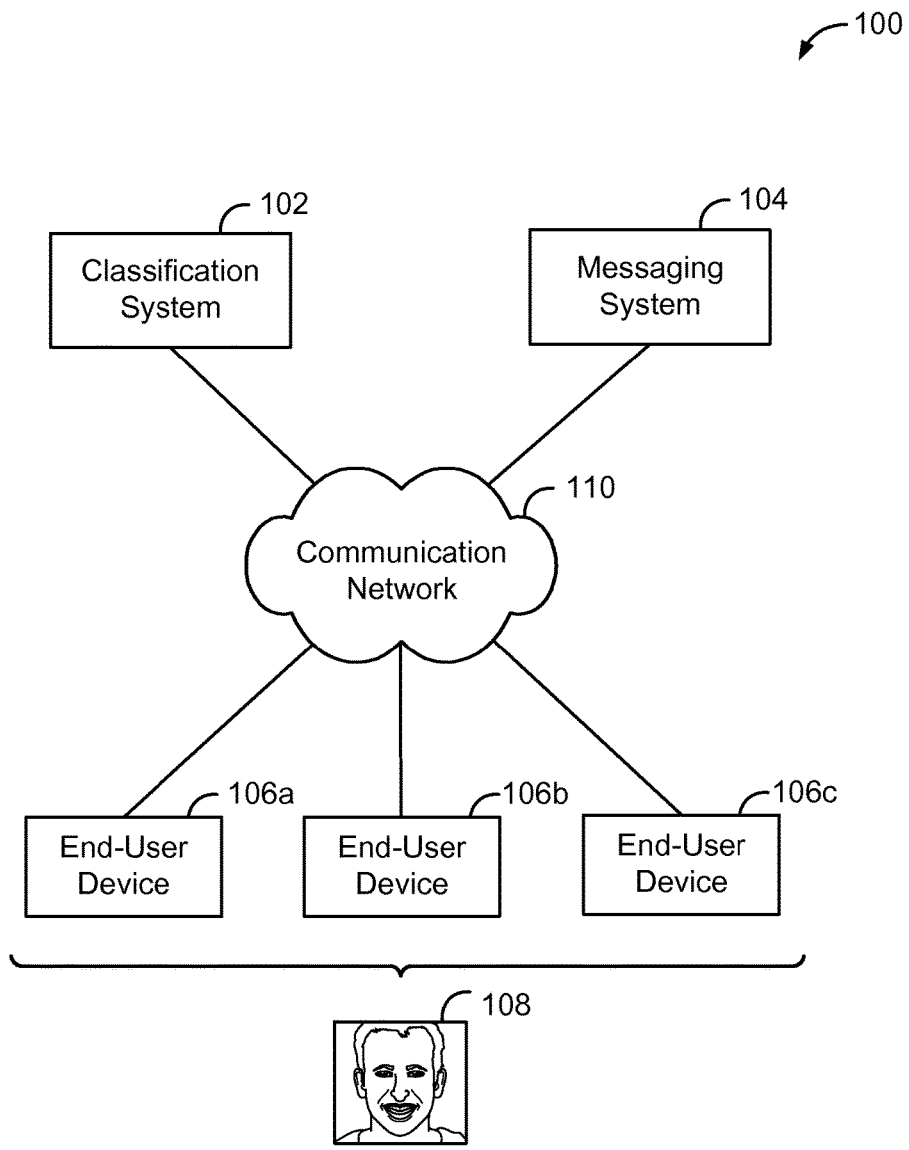
FIG. 1 is a simplified block diagram of an example system.

As indicated above, various types of devices may output messages for use by respective users of these devices. In some instances, multiple ones of these devices may be associated with a common user. For example, in the case where a user owns a laptop, a cellular telephone, and a land-line telephone, each of these devices may be associated with that user. Such associations may be reflected, for instance, in a database that links user identifiers with device identifiers.

In some instances, it may be desired to provide a message to a user. For example, in connection with a health-monitoring or health-management service, it may be desired to provide to a user, a health-related message, such as a reminder to exercise, or a reminder to take medication.

As one approach to providing a message to a user associated with multiple devices, a computing device may cause the message to be output by each of the multiple devices. However, while this may create a high probability that the user will receive the message, the user may become irritated by receiving the same message multiple times on multiple devices. Thus, as another approach, the computing device may cause the message to be output by a particular one of the multiple devices. However, with this approach, it may be difficult to determine which particular device should output the message.

To help address this issue, according to the present disclosure, a computing device may use a classification group to which the user belongs as a basis to select a device associated with the user, and further may transmit an instruction configured to cause the selected device to output the selected message. This may allow a message to be output to a user by a particular device that the user is most accustomed to using or that is most appropriate to be used for this purpose.

With this approach, as just a few examples, a message for a teenager may be output by a cellular telephone, a message for an adult may be output by a laptop, and a message for a senior may be output by a land-line telephone. However, there may be a variety of other types of classification groups to which a user may belong, and a variety of other types of devices may be selected and used for this purpose.

Further, a given device may have multiple output modalities, that is, multiple manners in which the device may output a message. For example, a cellular telephone may have a visual-based output modality, which may, for instance, allow the device to output a message by displaying a text version of the message on a display screen such that the message can be read by a user. As another example, the device may have an audible-based output modality, which may, for instance, allow the device to output the message by playing a recorded or generated audio version of the message via a speaker such that the message can be heard by the user. However, as with the issue of selecting a device from among multiple devices associated with a user, it may be difficult to determine which particular output modality a given device should using in connection with outputting the message.

To help address this issue, according to the present disclosure, a computing device may use a classification group to which the user belongs as a basis to select an output modality of a device, and further may transmit an instruction configured to cause the device to output the selected message using the selected output modality. This may allow the device to output a message using an output modality that the user is most accustomed to or that is most appropriate to be used for this purpose.

With this approach, as just a couple of examples, a message for a hearing-impaired user may be output by a device using a visual-based output modality, and a message for a vision-impaired person may be output by a device using an audible-based output modality. However, there may be a variety of other types of classification groups to which a user may belong, and a variety of other types of output modalities may be selected and used for this purpose.

II. Example System

FIG. 1 is a simplified block diagram of an example system 100 in which aspects of the present disclosure can be implemented. As shown, the system 100 includes a classification system 102, a messaging system 104, end-user devices 106a-c associated with a common user 108, and a communication network 110. Notably, for illustrative purposes, the system 100 includes three end-user devices 106a-c. However, it should be noted that the system 100 may include any number of end-user devices.

A. Classification System

The classification system may be implemented as a computing device, and may take a variety of forms, including for example, a server. Other examples are possible as well.

The classification system 102 may be configured for performing various operations, including for example, selecting a message, classifying the user 108 into a classification group, selecting one of the end-user devices 106a-c based on the classification group, and transmitting an instruction that causes the selected message to be output on the selected end-user device. In one example, the classification system 102 may cause a message to be output by the selected end-user device by transmitting an instruction to the messaging system 104, which in turn, transmits the selected message to the selected end-user device.

B. Messaging System

The messaging system 104 may be implemented as a computing device, and may take a variety of forms, including for example, an email server, a text message distribution system, an automated telephone call system, and/or a combination thereof. Other examples are possible as well.

The messaging system 104 may be configured for performing various operations, including for example, transmitting a message to one or more of the end-user devices 106a-c, perhaps in response to receiving an instruction from the classification system 102. Such messages may take a variety of forms, including for example an email message, a text messages, a telephone call, or a video-conferencing call. Other examples are possible as well.

C. End-User Device

Each of the end-user devices 106a-c may be implemented as a computing device, and may take a variety of forms, including for example, a workstation, a laptop, a tablet, a cellular telephone, a media player, a gaming device, a wearable device, a children's toy, a land-line telephone, a television set, or a vehicle entertainment system. Other examples are possible as well.

Each of the end-user devices 106a-c may be configured for performing various operations, including for example, outputting a message. Each of the end-user devices 106a-c may also have multiple output modalities, that is, multiple manners in which the device may output a message. For example, a cellular telephone may have a visual-based output modality or an audible-based output modality. Other types (and perhaps more granular types) of output modalities are possible as well. For example, a given output modality may involve outputting a message using particular fonts or colors, or together with certain types of graphics or themes (e.g., an avatar of the user speaking the message). Other examples are possible as well.

As noted above, the end-user devices 106a-c may be associated with the user 106. Such associations may be reflected, for instance, in a database that links user identifiers with device identifiers. In one example, the classification system 102 may maintain this database in a data storage, and the classification system 102 may update the database as appropriate to reflect associations between certain end-user devices and certain users (e.g., in response to a user requesting that a particular device be linked to that user, such as in connection with a device registration process).

D. Communication Network

The communication network 110 may take a variety of forms, including for example, a cellular telephone network, a land-line telephone network, a packet-switched network such as the Internet, and/or a combination of such networks. Other examples are possible as well.

The communication network 108 may be configured for performing various operations, including for example, facilitating communication between the classification system 102, the messaging system 104, and the end-user devices 106a-c, using one or more protocols.

For illustrative purposes, the communication network 110 is depicted as a single communication network through which the classification system 102, the messaging system, and the end-user devices 106a-c may communicate. Notably however, the communication network 110 may include two or more separate communication networks, each configured for facilitating communication between select systems or devices.

For example, where one of the end-user devices 106a-c is a laptop, the messaging system 104 may communicate with the end-user device via the Internet. As another example, where one of the end-user devices 106a-c is a cellular telephone, the messaging system 104 may communicate with the end-user device via a cellular telephone network. As yet another example, where one of the end-user devices 106a-c is a land-line telephone, the messaging system 104 may communicate with the end-user device via a land-line telephone network.

III. Example Computing Device

Figure 2:
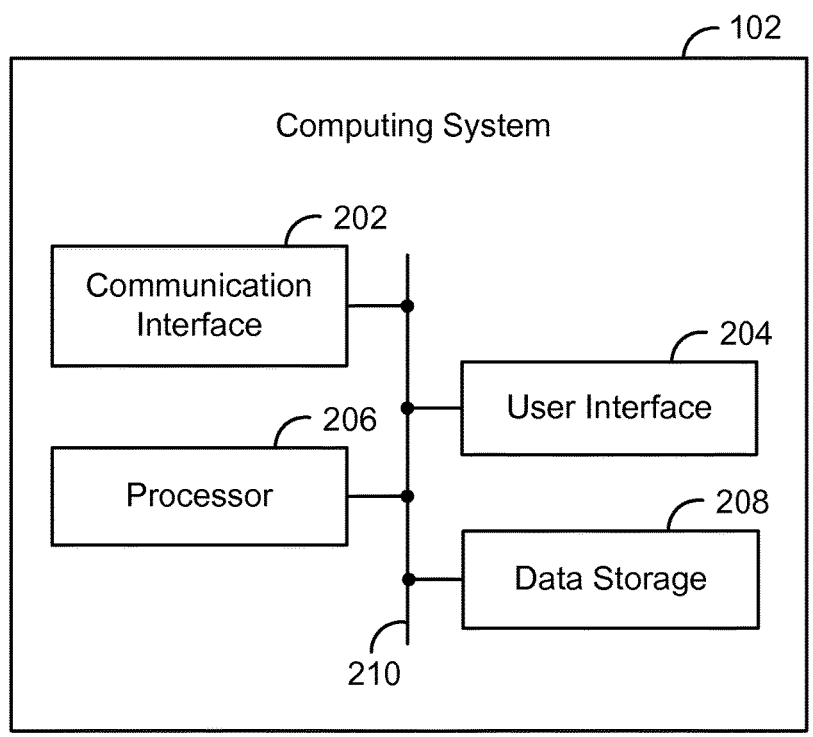
FIG. 2 is a simplified block diagram of an example computing device.

FIG. 2 is a simplified block diagram of an example computing device 200. The computing device 200 may be configured for performing a variety of functions or acts, such as those described in this disclosure (including the accompanying drawings). The computing device 200 may take a variety of forms, including for example. The computing device 200 may include various components, including for example, a communication interface 202, a user interface 204, a processor 206, and a data storage 208, all of which may be communicatively linked to each other via a system bus, network, or other connection mechanism 210.

The communication interface 202 may take a variety of forms and may be configured to allow the computing device 200 to communicate with one or more devices or systems according to one or more protocols. In one example, the communication interface 202 may take the form of a wired interface, such as an Ethernet interface. As another example, the communication interface 202 may take the form of a wireless interface, such as a cellular or WI-FI interface.

The user interface 204 may facilitate interaction with a user of the computing device 200 if applicable. As such, the user interface 204 may include input components such as a keypad, a touch-sensitive panel, a microphone, and a camera, and output components such as a display screen (which, for example, may be combined with a touch-sensitive panel), a sound speaker, and a haptic feedback system.

The processor 206 may include a general purpose processor (e.g., a microprocessor) and/or a special purpose processor (e.g., a digital signal processors (DSP)).

The data storage 208 may include one or more volatile, non-volatile, removable, and/or non-removable storage components, such as magnetic, optical, or flash storage, and may be integrated in whole or in part with the processor 206. Further, the data storage 208 may take the form of a non-transitory computer-readable storage medium, having stored thereon program instructions (e.g., compiled or non-compiled program logic and/or machine code) that, when executed by the processor 206, cause the computing device 200 to perform one or more functions or acts, such as those described in this disclosure. Such program instructions may define or be part of a discrete software application, such a native app or web app, that can be executed upon user request for instance. The data storage 208 may also store other types information or data, such as those types described throughout this disclosure.

IV. Example Operations

Figure 3:
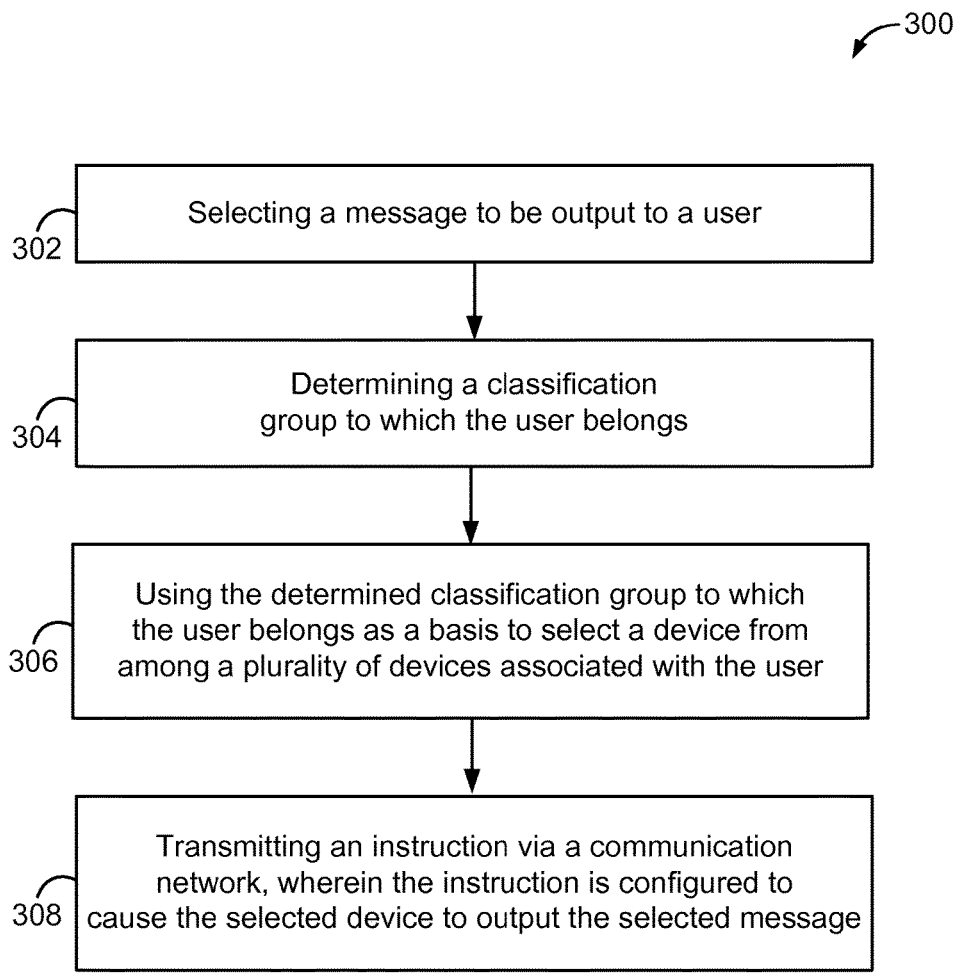
FIG. 3 is a flow chart depicting acts of an example method.

FIG. 3 is a flow chart depicting acts that can be carried out in an example method 300.

At block 302, the method involves selecting a message to be output to a user. For instance, this may involve selecting, by the classification system 102, a message to be output to the user 108.

The message may provide a variety of different types of information. For instance, in connection with a health-monitoring or health-management service, the message may be a health-related message, such as a reminder to exercise, or a reminder to take medication. The classification system 102 may select a message to be output based on various types of information. For example, the classification system 102 may select a particular health-related message based on an analysis of health-related information associated with the user 108. Such health-related information may be obtained in various ways, such as via a sensor located near the user 108. Other examples are possible as well.

At block 304, the method involves determining a classification group to which the user belongs. For instance, this may involve determining, by the classification device 102 a classification group to which the user 108 belongs.

In one example, the classification group is a demographic-based classification group, such as an age-based classification group. As such, in one example, the method may involve the classification system 102 determining, based on the age of the user 108, that the user 108 belongs to a particular one of multiple age-based classification groups. Such multiple age-based classification groups may include, for example, a group A1 for users between the ages 13-19, a group A2 for users between the ages of 20-65, and a group A3 for users over the age of 65. In one example, the classification system 102 may determine the age of the user 108 by retrieving information about the user 108 from a data storage. Other examples are possible as well.

At block 306, the method involves using the determined classification group to which the user belongs as a basis to select a device from among a plurality of devices associated with the user. For instance, this may involve, the classification system 102 using the determined classification group to which the user 108 belongs as a basis to select the end-user device 106a from among the end-user devices 106a-c.

In one example, this may involve the classification system 102 using mapping data, perhaps stored in a data storage, as a basis to map a particular classification group to a particular type of end-user device. Such mapping data may, for instance, map the group A1 to a cellular telephone device type. This mapping may reflect a likelihood that a teenager may be more accustomed to using a cellular telephone than other devices, and thus may prefer that a message be output by the user's cellular telephone rather than by another device.

As another example, the mapping data may, for instance, map the group A2 to a laptop device type. This mapping may reflect a likelihood that an adult may be more accustomed to using a laptop than other devices, and thus may prefer that a message be output by the user's laptop rather than by another device.

As yet another example, such mapping data may, for instance, map the group A3 to a land-line telephone device type. This mapping may reflect a likelihood that a senior may be more accustomed to using a land-line telephone than other devices, and thus may prefer that a message be output by the user's land-line telephone rather than by another device.

Other example mapping are possible and may be configured to reflect logical links between types of users and types of devices that may be most appropriate for those users.

In some instances, the classification system 102 may use additional information as a basis to select a device from among a plurality of devices associated with the user. For instance, the classification system may use the time of day as a further basis (to reflect a user's preference of a particular device at a particular time of the day).

At block 308, the method involves transmitting an instruction via a communication network, wherein the instruction is configured to cause the selected device to output the selected message. For instance, this may involve transmitting, by the classification system 102, via the communication network 110, an instruction configured to cause the end-user device 106a to output the selected message.

In one example, the classification system 102 may transmit the instruction to the messaging system 104. In response to receiving the instruction, the messaging system 104 may cause the end-user device 106a to output the selected message, such as by transmitting the message to the end-user device 106a. In another example, the classification system 102 may have integrated there within, the messaging system 104, and thus, the classification system may cause the end-user device 106a to output the selected message by transmitting the message to the end-user device 106a. Other examples are possible as well.

Figure 4:
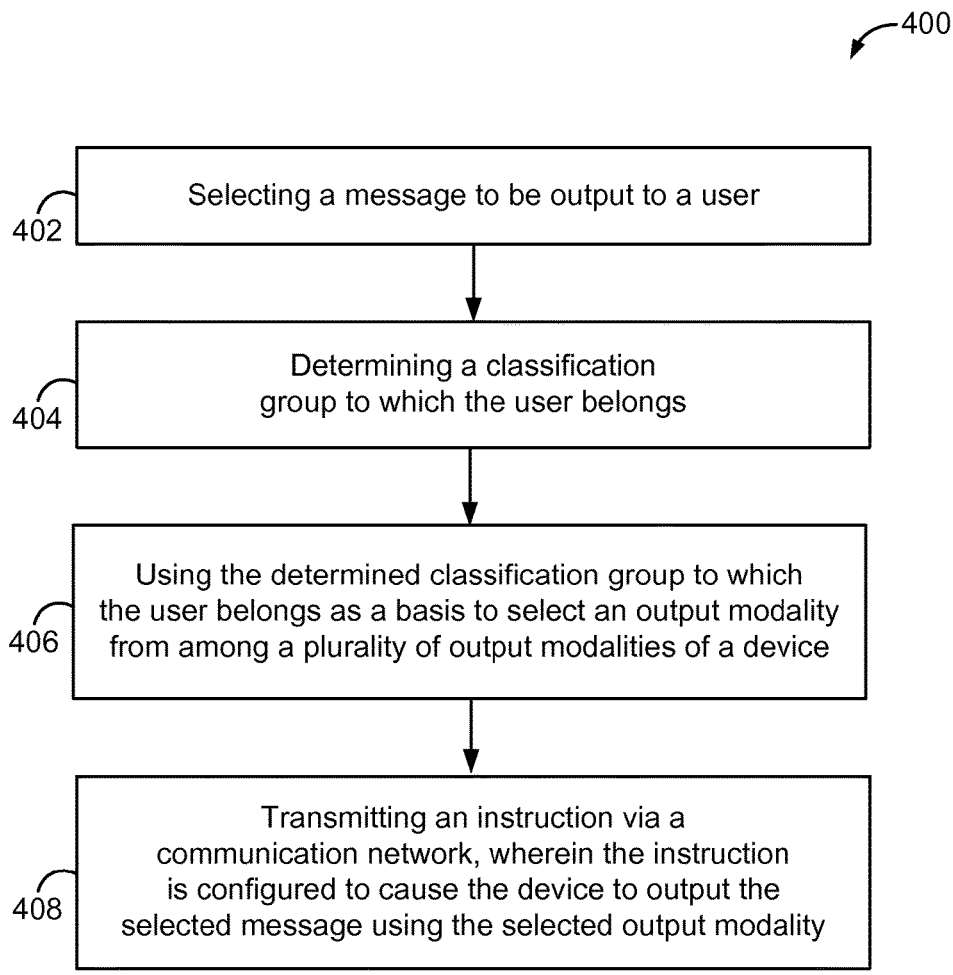
FIG. 4 is a flow chart depicting acts of another example method.

FIG. 4 is a flow chart depicting acts that can be carried out in an example method 400.

At block 402, the method involves selecting a message to be output to a user. For instance, this may involve selecting, by the classification system 102, a message to be output to the user 108.

At block 404, the method involves determining a classification group to which the user belongs. For instance, this may involve determining, by the classification system 102 a classification group to which the user 108 belongs.

In one example, the classification group is a demographic-based classification group, such as a disability-based classification group. As such, in one example, the method may involve the classification system 102 determining, based on a disability of the user 108, that the user 108 belongs to a particular one of multiple disability-based classification groups. Such multiple disability-based classification groups may include, for example, a group B1 for users who are hearing-impaired and a group B2 for users who are vision-impaired. In one example, the classification system 102 may determine the disability of the user 108 by retrieving information about the user 108 from a data storage.

At block 406, the method involves using the determined classification group to which the user belongs as a basis to select an output modality from among a plurality of output modalities of a device. For instance, this may involve, the classification system 102 using the determined classification group to which the user 108 belongs as a basis to select an output modality from a plurality of output modalities of the end-user device 106a.

In one example, this may involve the classification system 102 using mapping data, perhaps stored in a data storage, as a basis to map a particular classification group to a particular output modality of a device. Such mapping data may, for instance, map the group B1 to an audible-based output modality. This mapping may reflect a likelihood that a hearing-impaired user may prefer that a message be output by an audible-based output modality, and thus may prefer that a message be output using such an output modality rather than by another output modality.

As another example, such mapping data may, for instance, map the group B2 to a visual-based output modality type. This mapping may reflect a likelihood that a vision-impaired user may prefer that a message be output by a visual-based output modality, and thus may prefer that a message be output using such an output modality rather than by another output modality. Other examples mappings are possible as well.

At block 408, the method involves transmitting an instruction via a communication network, wherein the instruction is configured to cause the device to output the selected message using the selected output modality.

For instance, this may involve transmitting, by the classification system 102, via the communication network 110, an instruction configured to cause the end-user device 106a to output the selected message using the selected output modality.

In one example, the classification system 102 may transmit the instruction to the messaging system 104. In response to receiving the instruction, the messaging system 104 may cause the end-user device 106a to output the selected message using the selected output modality, such as by transmitting the message and an indication of the selected output modality, to the end-user device 106a. In another example, the classification system 102 may have integrated there within, the messaging system 104, and thus, the classification system may cause the end-user device 106a to output the selected message using the selected output modality by transmitting the message and the selected output modality, to the end-user device 106a. Other examples are possible as well.

V. Example Variations

In situations in which examples of the disclosed systems, devices, and methods collect personal information about users, or may make use of personal information, the users may be provided with an opportunity to control whether programs or features collect user information (e.g., information that could be used to determine a demographic group to which the user belongs). In addition, certain data may be treated in one or more ways before it is stored or used, so that personally identifiable information is removed. For example, a user's identity may be treated so that no personally identifiable information can be determined for the user. Thus, the user may have control over how information is collected about the user and how the information used in connection with the example features described herein.

The variations described in connection with select examples of the disclosed systems, devices, and methods may be applied to all other examples of the disclosed systems devices, and methods. For instance, the variations described in connection with the example method 300 may be applied to the example method 400.

Further, while one or more acts have been described as being performed by or otherwise related to certain systems or devices (e.g., the classification system 102), the acts may be performed by or be otherwise related to any system or device.

Further, the acts need not be performed in the disclosed order, although in some examples, an order may be preferred. Also, not all acts need to be performed to achieve the desired advantages of the disclosed systems, devices, and methods, and therefore not all acts are required.

While select examples of the present disclosure have been described, alterations and permutations of these examples will be apparent to those of ordinary skill in the art. Other changes, substitutions, and alterations are also possible without departing from the invention in its broader aspects as set forth in the following claims.

The invention claimed is:

1. A method comprising:
   selecting, by a computing device, a message to be output to a user;
   determining a classification group to which the user belongs, wherein determining the classification group to which the user belongs comprises determining demographic data of the user;
   using at least mapping logic to select a device from among a plurality of devices associated with the user based on at least the determined classification group, wherein the mapping logic maps particular classification groups to particular types of devices; and
   transmitting, by the computing device, an instruction via a communication network to a messaging system, wherein the messaging system is configured to cause the selected device to output the selected message in response to receiving the instruction.

2. The method of claim 1, wherein determining demographic data of the user comprises determining an age of the user.

3. The method of claim 1, wherein the selected device comprises a cellular telephone.

4. The method of claim 1, wherein the selected device comprises a land-line telephone.

5. The method of claim 1, wherein the selected device comprises a television set.

6. The method of claim 1, wherein selecting a message to be output to a user comprises analyzing health-related information associated with the user, and wherein the message provides health-related information.

7. The method of claim 1, wherein determining demographic data of the user comprises determining a disability of the user.

8. A non-transitory computer-readable medium having stored thereon program instructions that when executed by a processor, cause performance of a set of acts comprising:
   selecting a message to be output to a user;
   determining a classification group to which the user belongs, wherein determining the classification group to which the user belongs comprises determining demographic data of the user;
   using at least mapping logic to select a device from among a plurality of devices associated with the user based on at least the determined classification group, wherein the mapping logic maps particular classification groups to particular types of devices; and
   transmitting an instruction via a communication network to a messaging system, wherein the messaging system is configured to cause the selected device to output the selected message in response to receiving the instruction.

9. The non-transitory computer-readable medium of claim 8, wherein determining demographic data of the user comprises determining an age of the user.

10. The non-transitory computer-readable medium of claim 8, wherein the selected device comprises a cellular telephone.

11. The non-transitory computer-readable medium of claim 8, wherein the selected device comprises a land-line telephone.

12. The non-transitory computer-readable medium of claim 8, wherein the selected device comprises a television set.

13. The non-transitory computer-readable medium of claim 8,
   wherein selecting a message to be output to a user comprises analyzing health-related information associated with the user, and wherein the message provides health-related information.

14. The non-transitory computer-readable medium of claim 8, wherein determining demographic data of the user comprises determining a disability of the user.

15. A method comprising:
   selecting, by a computing device, a message to be output to a user;
   determining a classification group to which the user belongs, wherein determining the classification group to which the user belongs comprises determining demographic data of the user;
   using at least mapping logic to select an output modality from among a plurality of output modalities of a device associated with the user based on at least the determined classification group, wherein the mapping logic maps particular classification groups to particular output modalities; and
   transmitting, by the computing device, an instruction via a communication network to a messaging system, wherein the messaging system is configured to cause the device to output the selected message using the selected output modality in response to receiving the instruction.

16. The method of claim 15, wherein determining demographic data of the user comprises determining a disability of the user.

17. The method of claim 16, wherein determining a disability of the user comprises determining that the user is hearing-impaired, and wherein the selected output modality comprises a visual-based output modality.

18. The method of claim 16, wherein determining a disability of the user comprises determining that the user is vision-impaired, and wherein the selected output modality comprises an audible-based output modality.

19. The method of claim 15, wherein selecting a message to be output to a user comprises analyzing health-related information associated with the user, and wherein the message provides health-related information.

20. The method of claim 15, wherein determining demographic data of the user comprises determining an age of the user.

* * * * *